US009784910B1

(12) United States Patent
Yaguchi (10) Patent No.: US 9,784,910 B1
(45) Date of Patent: Oct. 10, 2017

(54) BACKLIGHT APPARATUS AND LIQUID CRYSTAL DISPLAY DEVICE (71) Applicant: Panasonic Liquid Crystal Display Co., Ltd., Himeji-shi, Hyogo (JP)

(72) Inventor: Takenori Yaguchi, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/085,725

(22) Filed: Mar. 30, 2016

(51) Int. Cl.
*G02F 1/1335* (2006.01)
*F21V 8/00* (2006.01)

(52) U.S. Cl.
CPC ................... *G02B 6/0088* (2013.01)

(58) Field of Classification Search
CPC ................................................ G02B 6/0088
USPC ........................................................ 349/65
See application file for complete search history.

(56) References Cited

U.S. PATENT DOCUMENTS

| 2010/0283943 | A1* | 11/2010 | Kimura et al. ..... B32B 38/1841 349/96 |
| 2014/0267971 | A1 | 9/2014 | Sugimoto et al. |
| 2015/0219838 | A1* | 8/2015 | Jang .................... G02B 6/0088 349/65 |

FOREIGN PATENT DOCUMENTS

JP          2014-174540          9/2014

* cited by examiner

*Primary Examiner* — Lucy Chien
(74) *Attorney, Agent, or Firm* — Hamre, Schumann, Mueller & Larson, P.C.

(57) ABSTRACT

A backlight apparatus is provided that may have: a backlight having a light guide plate; and a frame supporting the backlight and having a fitted portion. The light guide plate has a light guide main body, and a protruding portion extending outward from one of side edges of the light guide main body. The protruding portion is fitted into the fitted portion. The light guide plate is provided with a gap formed at least partially in the protruding portion. The gap defines a first wall extending from one of a top surface and a bottom surface of the light guide plate toward the other of the top surface and the bottom surface. The first wall provides a reflection surface for light waves carried by the light guide plate that approach the protruding portion.

22 Claims, 14 Drawing Sheets

BACKLIGHT APPARATUS AND LIQUID CRYSTAL DISPLAY DEVICE

FIELD

The present described embodiments relate to a backlight apparatus and a liquid crystal display device.

BACKGROUND

Liquid crystal display devices are used across a wide range of industries. A liquid crystal display has a liquid crystal panel, and a backlight including a light guide plate. Light from the light guide plate is directed to the liquid crystal panel to produce emitted images.

SUMMARY

In accordance with one described embodiment, a backlight apparatus is provided. The backlight apparatus comprises: a backlight comprising a light guide plate; and a frame supporting the backlight and comprising a fitted portion. The light guide plate comprises a light guide main body with linear side edges, and a protruding portion extending outward from one of the side edges of the light guide main body in a first direction orthogonal to a thickness direction of the light guide plate. The protruding portion is fitted into the fitted portion. The light guide plate is provided with a gap formed at least partially in the protruding portion. The gap defines a first wall extending from one of a top surface and a bottom surface of the light guide plate toward the other of the top surface and the bottom surface. The first wall provides a reflection surface for light waves carried by the light guide plate that approach the protruding portion.

In accordance with another described embodiment, a liquid crystal display device is provided. The liquid crystal display device comprises: the backlight apparatus described herein; and a liquid crystal panel mounted on a light emitting side of the backlight apparatus. At least a part of the gap of the light guide plate is disposed outside the liquid crystal panel as viewed in the thickness direction.

DETAILED DESCRIPTION

Figure 1:
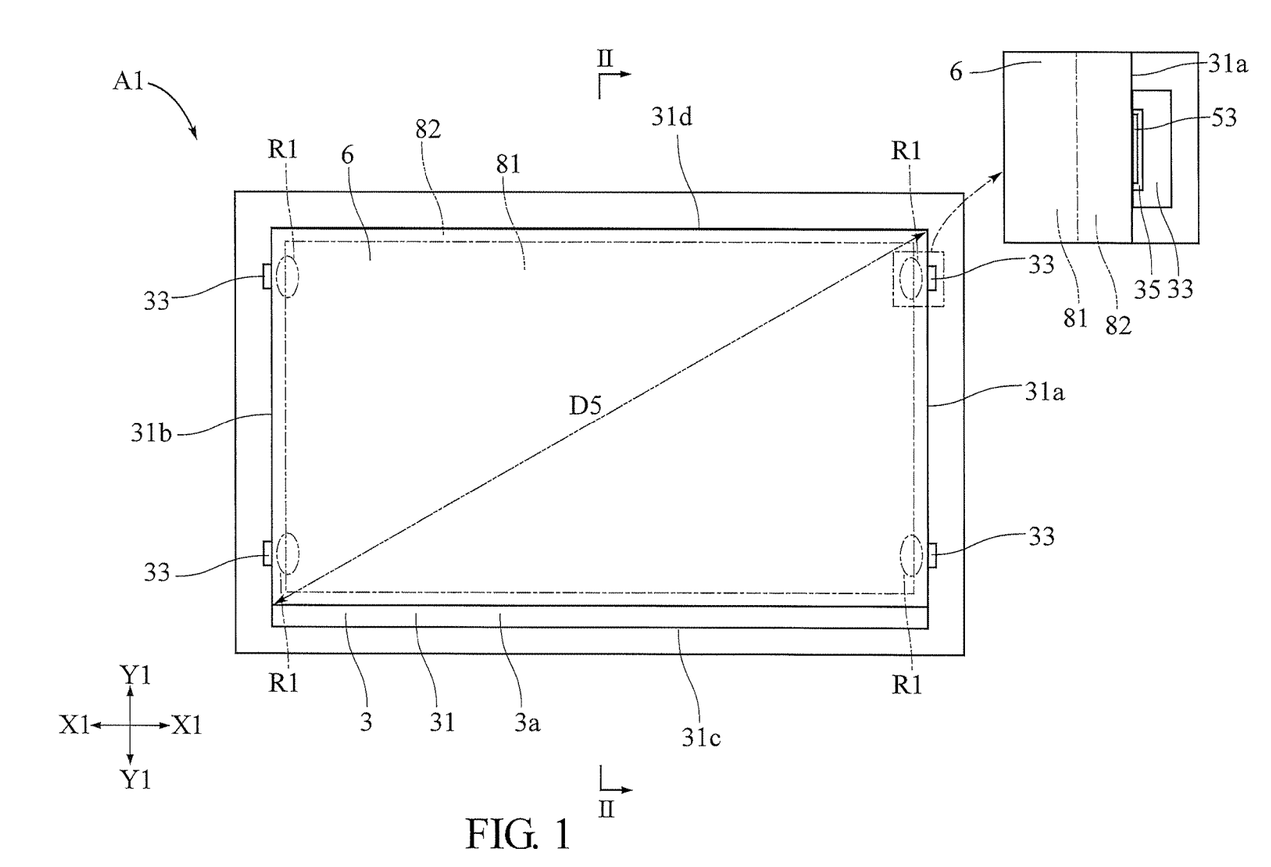
FIG. 1 is a top view of a liquid crystal display device according to one embodiment.
Figure 2:
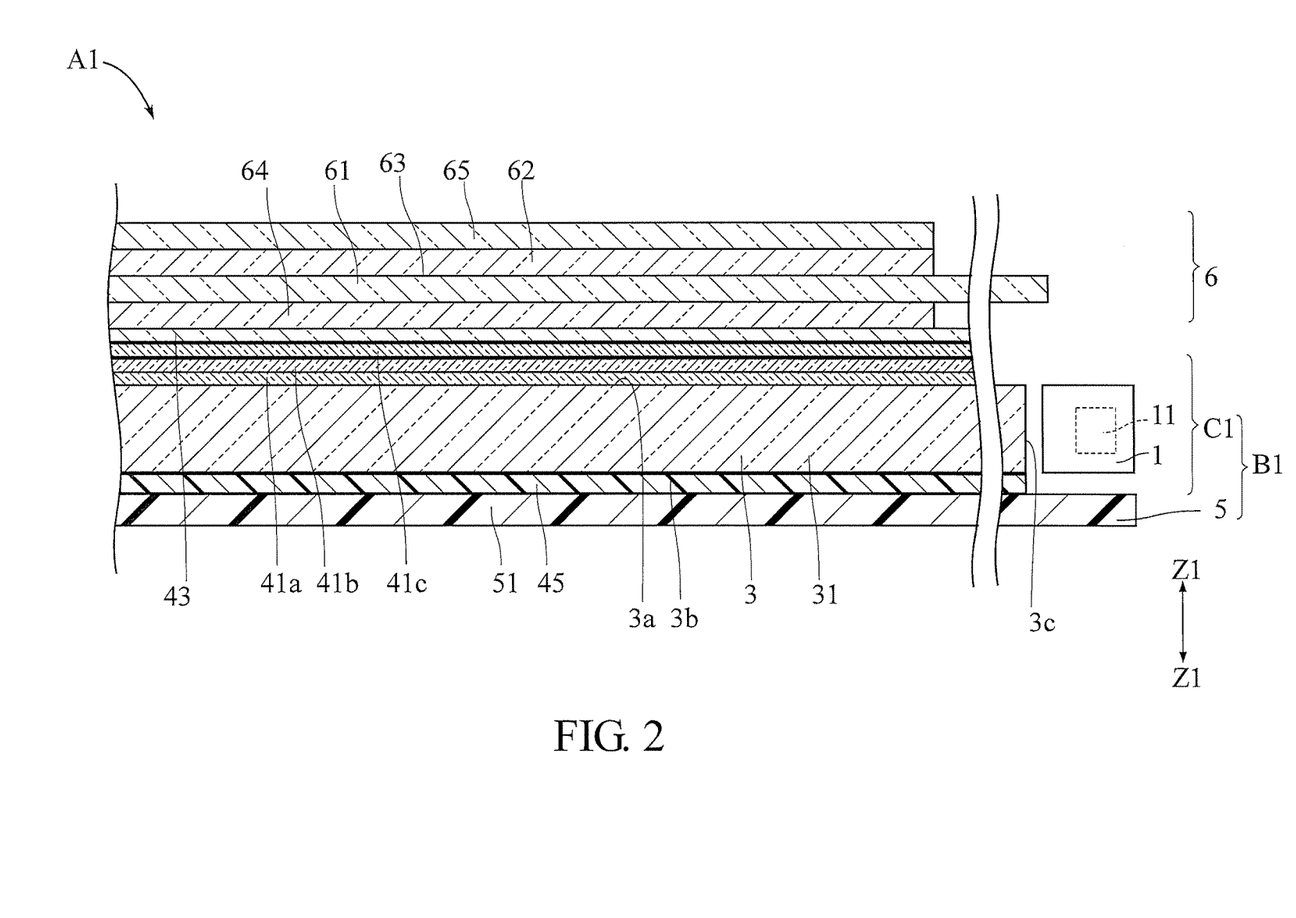
FIG. 2 is a partial cross-sectional view taken along a line II-II in FIG. 1.

FIG. 1 is a top view of a liquid crystal display device according to one embodiment. FIG. 2 is a partial cross-sectional view taken along a line II-II in FIG. 1.

The liquid crystal display device A1 shown in these figures can be used for various electronic devices, such as televisions and personal computers. In the illustrated embodiment, the liquid crystal display device A1 is a transmissive liquid crystal display device.

As shown in FIG. 2, the liquid crystal display device A1 comprises a backlight apparatus B1, a liquid crystal panel 6, and an integrated circuit driver (not shown). The backlight apparatus B1 comprises a backlight C1 and a frame 5. The backlight C1 irradiates planar light to the liquid crystal panel 6. The backlight C1 includes a light source 1, a light guide plate 3, a plurality of optical sheets 41a, 41b, 41c, and a reflection sheet 45. The frame 5 supports the backlight C1 (the light source 1, the light guide plate 3, the optical sheets 41a, 41b, 41c, and the reflection sheet 45).

The light source 1 generates light and emits the light to the light guide plate 3. Specifically, the light source 1 comprises at least one light source element 11 (e.g., light emitting diode). The at least one light source element 11 generates light, and the light generated by the light source element 11 proceeds toward the light guide plate 3.

The light guide plate 3 converts the light from the light source 1 into planar light. The light guide plate 3 is made of a light transmitting material. The whole light guide plate 3 can be made of the light transmitting material. The light guide plate 3 may be made of, but is not limited to, synthetic resin, such as methacrylic resin, styrene resin, polycarbonate resin, and acrylic resin. The light guide plate 3 has a top surface 3a, a bottom surface 3b, and a light incident surface 3c. The bottom surface 3b is formed with fine indentations (not shown for simplifying the drawings), such as prism patterns and dot patterns. The fine indentations are provided for efficiently converting the direction of light guided within the light guide plate 3 to an upward direction towards the top surface 3. The fine indentations can convert the light made incident into the light guide plate 3 into uniform light. The uniform light is radiated from the top surface 3a. As such, the light guide plate 3 can radiate light by in-plane light radiation.

The top surface 3a and the bottom surface 3b are on opposite sides from each other, i.e., on the top and bottom of the light guide plate 3 in a stacking direction of the reflection sheet 45, the light guide plate 3, and the liquid crystal panel 6. The stacking direction is in parallel to a thickness direction Z1 of the light guide plate 3. The top surface 3a and the bottom surface 3b are spaced apart from each other in the thickness direction Z1 of the light guide plate 3. In the illustrated embodiment, the top surface 3a and the bottom surface 3b are in parallel. The distance between the top surface 3a and the bottom surface 3b (i.e., the thickness of the light guide plate 3) can be, but is not limited to, from 1 mm to 4 mm. In the illustrated example, the light incident surface 3c extends between both of the top surface 3a and the bottom surface 3b. The light incident surface 3c faces the light source 1. The light emitted by the light source 1 is made incident into the light incident surface 3c. Then, the light made incident into the light incident surface 3c is transmitted within the light guide plate 3, and is converted into planar light across the light guide plate 3. Then, the planar light is emitted from the top surface 3a, which functions as a light emitting surface.

As shown in FIG. 1, the light guide plate 3 comprises a light guide main body 31 and a plurality of protruding portions 33.

The light guide main body 31 can be rectangular as viewed in the thickness direction Z1. The light guide main body 31 forms the top surface 3a, the bottom surface 3b, and the light incident surface 3c. The light guide main body 31 has a linear first side edge 31a, a linear second side edge 31b, a linear third side edge 31c, and a linear fourth side edge 31d. Each of the linear first side edge 31a, the linear second side edge 31b, the linear third side edge 31c, and the linear fourth side edge 31d is linear as viewed in the thickness direction Z1.

The first side edge 31a and the second side edge 31b are spaced apart from each other in a first direction X1 orthogonal to the thickness direction Z1. The first side edge 31a and the second side edge 31b are located on opposite sides of the light guide main body 31 in the first direction X1. Each of the first side edge 31a and the second side edge 31b extends along a second direction Y1 orthogonal to the first direction X1 and the thickness direction Z1.

The third side edge 31c and the fourth side edge 31d are spaced apart from each other in the second direction Y1. The third side edge 31c and the fourth side edge 31d are located on opposite sides of the light guide main body 31 in the second direction Y1. Each of the third side edge 31c and the fourth side edge 31d extends along the first direction X1. In the illustrated example, each of the third side edge 31c and the fourth side edge 31d is greater in length than each of the first side edge 31a and the second side edge 31b. However, in another embodiment, each of the third side edge 31c and the fourth side edge 31d can be smaller in length than each of the first side edge 31a and the second side edge 31b.

Each protruding portion 33 extends outward from one of the side edges of the light guide main body 31 as viewed in the thickness direction Z1. In the illustrated example, two protruding portions 33 are formed at the first side edge 31a side, and extend outward from the first side edge 31a. The other two protruding portions 33 are formed at the second side edge 31b side, and extend outward from the second side edge 31b. In the illustrated example, each protruding portion 33 is rectangular as viewed in the thickness direction Z1. Each protruding portion 33 may be integrally formed with the light guide main body 31.

In one embodiment, only one protruding portion, or three or more protruding portions may be formed at the first side edge 31a side. Similarly, in one embodiment, only one protruding portion, or three or more protruding portions may be formed at the second side edge 31b side. In another embodiment, one or more protruding portions may be formed at only the first side edge 31a side. In another embodiment, additional protruding portion(s) may be formed at the third side edge 31c side, or the fourth side edge 31d side.

Figure 3:
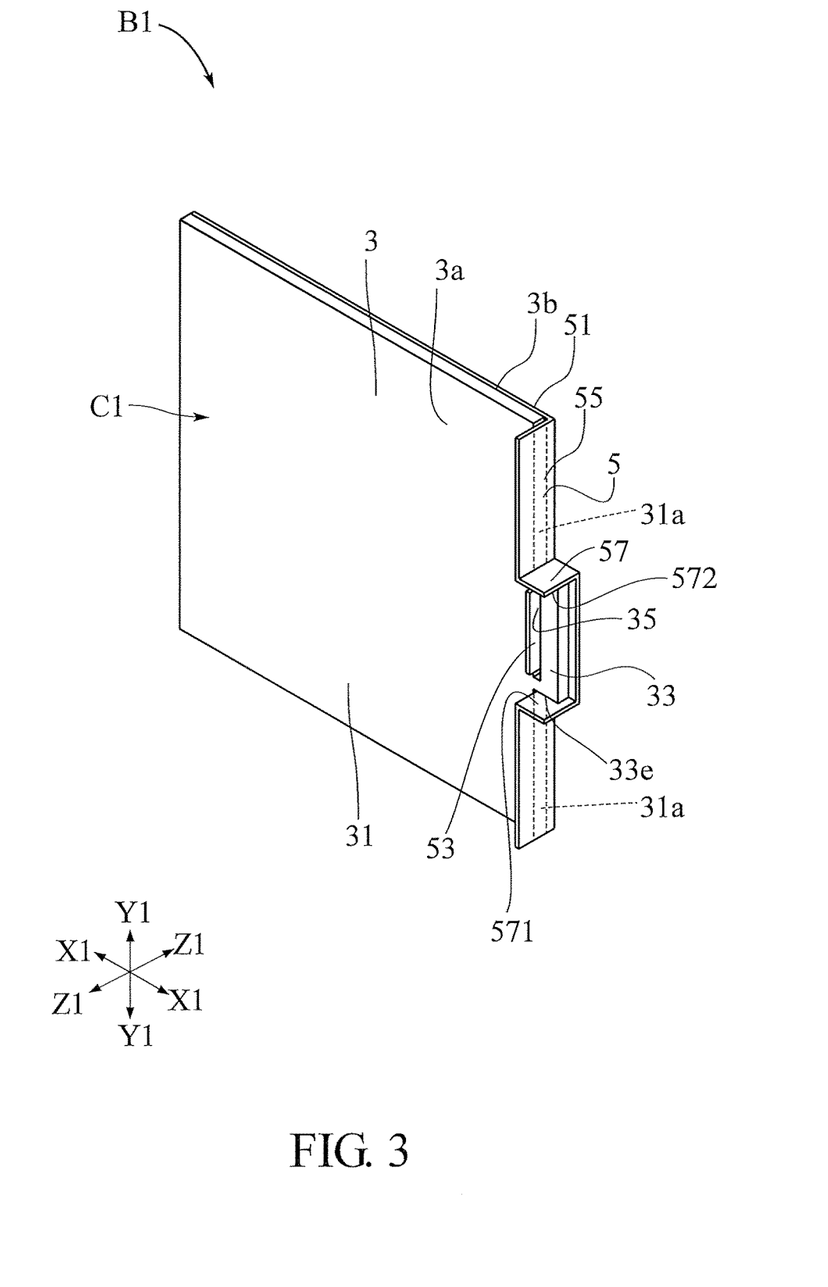
FIG. 3 is a partial perspective view of a backlight apparatus of the liquid crystal display device shown in FIG. 1.
Figure 4:
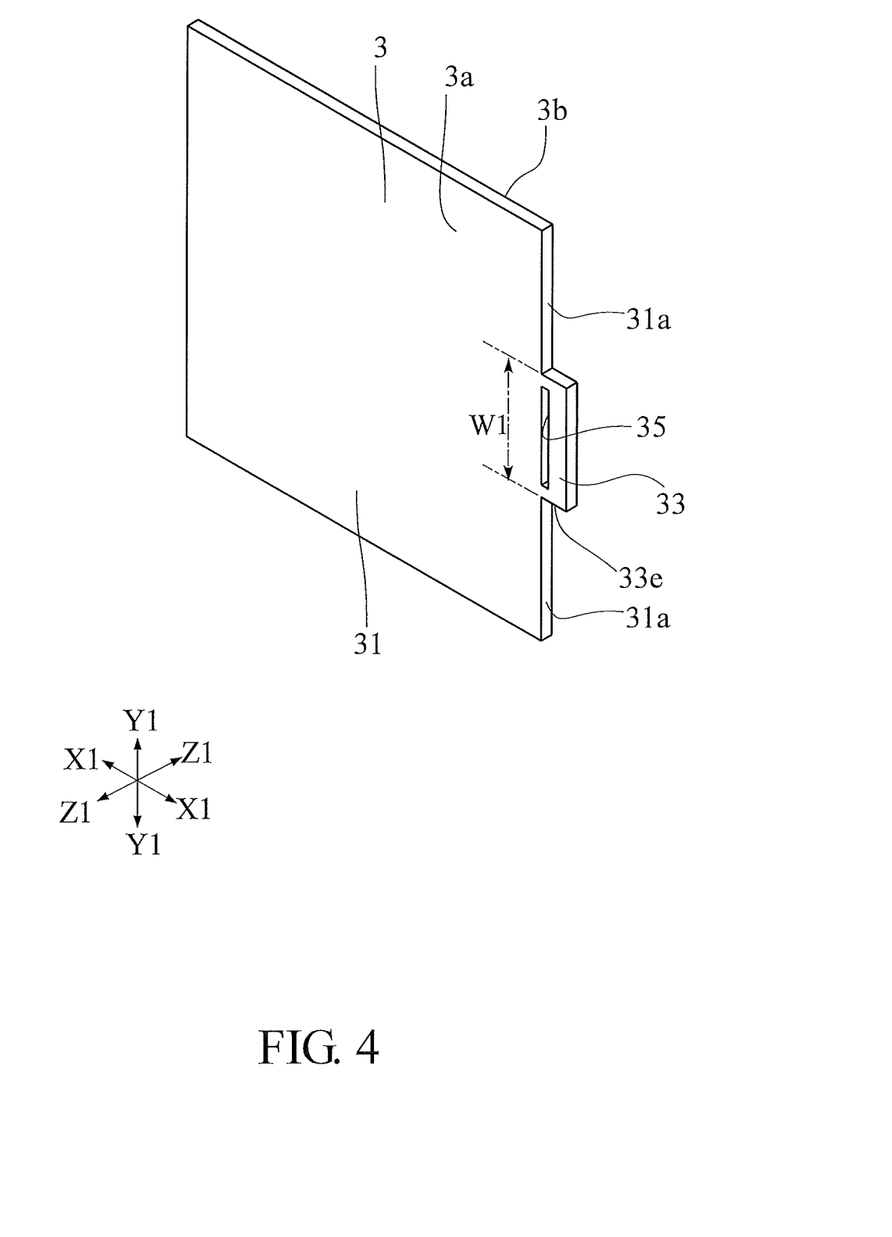
FIG. 4 is a partial perspective view of a light guide plate of the backlight shown in FIG. 3.
Figure 5:
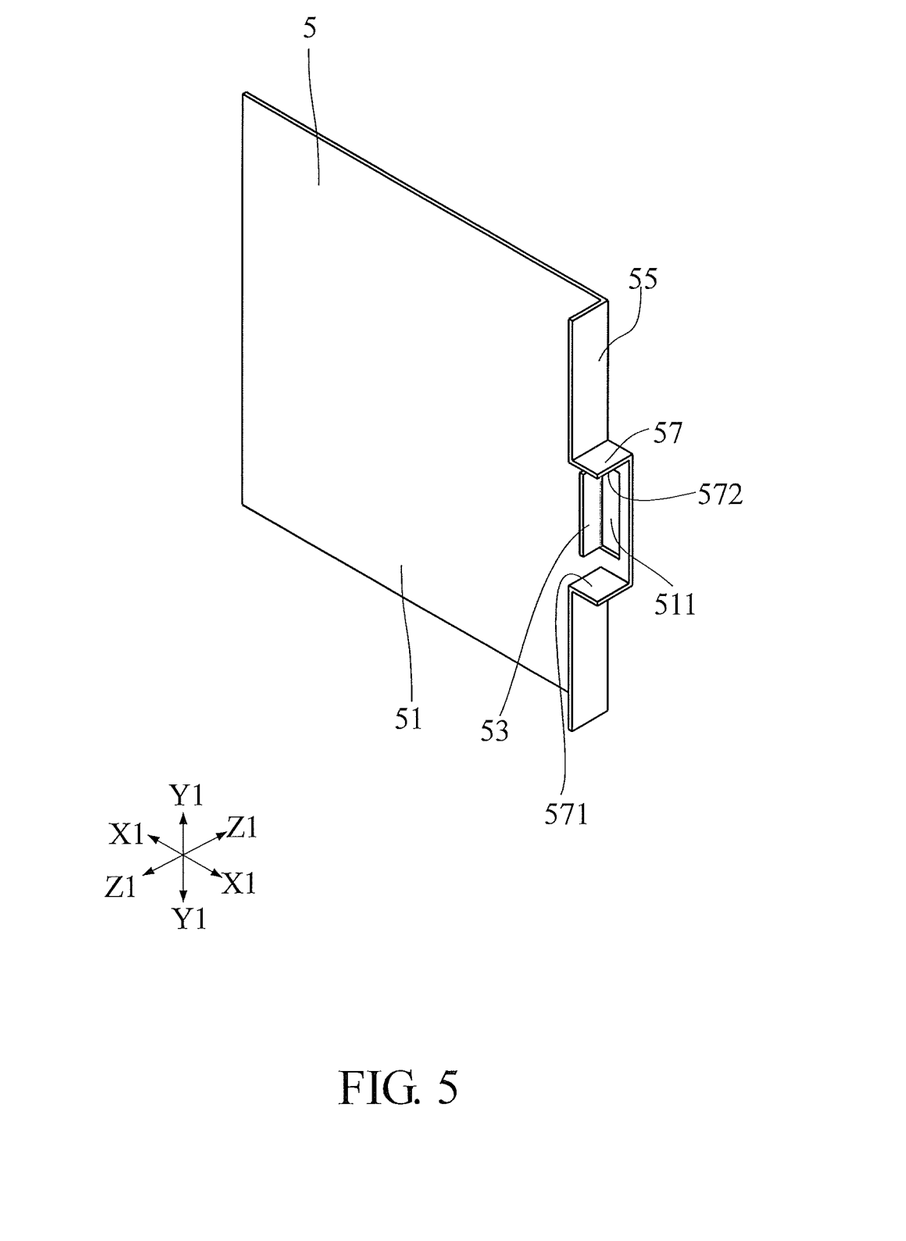
FIG. 5 is a partial perspective view of a frame of the backlight shown in FIG. 3.

FIG. 3 is a partial perspective view of the backlight apparatus of the liquid crystal display device shown in FIG. 1. In FIG. 3, only the light guide plate 3 and the frame 5 are shown, and illustration of the reflection sheet 45 and optical sheet 41a, 41b, 41c is omitted. FIG. 4 is a partial perspective view of the light guide plate of the backlight shown in FIG. 3. FIG. 5 is a partial perspective view of the frame of the backlight shown in FIG. 3.

Figure 6:
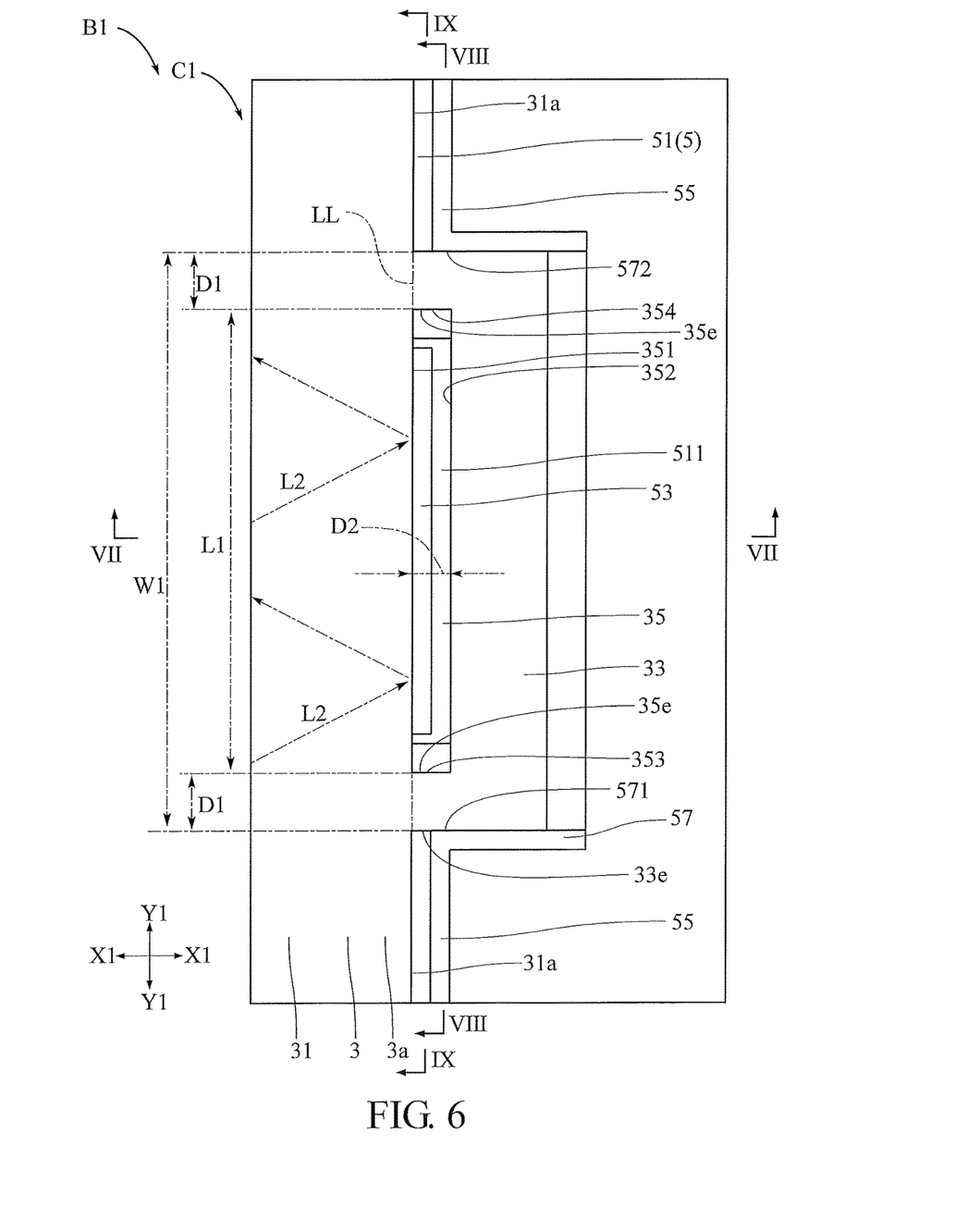
FIG. 6 is a partial top view of the backlight apparatus shown in FIG. 3.

The protruding portion 33 shown in FIGS. 3 and 4 extends outward from the first side edge 31a of the light guide main body 31 in the first direction X1. The protruding portions 33 are provided, for example, to reduce the chance of the light guide plate 3 from being displaced relative to the frame 5 if the liquid crystal display device A1 is subject to an impact during manufacture shipping or use. FIG. 6 is a partial top view of the backlight apparatus shown in FIG. 3. As shown in FIG. 6, an extension line LL of the first side edge 31a can define a border line between the protruding portion 33 and the light guide main body 31 as viewed in the thickness direction Z1. The dimension of the protruding portion 33 in the first direction X1 can be, but is not limited to, from 2 mm to 6 mm. The dimension of the protruding portion 33 in the second direction Y1 (i.e., the width W1 of the protruding portion 33) can be, but is not limited to, from 15 mm to 40 mm. The dimensions can be selected depending on the overall size of the liquid crystal display device A1 and the expected environment of use. The same is true for other dimensions discussed below.

The light guide plate 3 is provided with a gap 35. The gap 35 is formed at least partially in the protruding portion 33. In the illustrated embodiment, the whole gap 35 is formed in the protruding portion 33. The gap 35 may be, but is not limited to, a slit or a recessed portion. In this embodiment, as shown in FIG. 6, the gap 35 may extend longitudinally by a length L1 as viewed in the thickness direction Z1. The length L1 can be, but is not limited to, from 40% to 80% of the width W1 of the protruding portion 33 (i.e., the dimension of the protruding portion 33 in the second direction Y1). The gap 35 may prevent light in the light guide main body 31 from diffusing into the protruding portion 33 so that luminance along the first side edge 31a can be more uniform. Each end 35e of the gap 35 can be spaced from an edge 33e of the protruding portion 33 by a distance D1. The distance D1 can be, but is not limited to, from 5 mm to 10 mm. Such a gap may be formed in each protruding portion 33 shown in FIG. 1.

Figure 7:
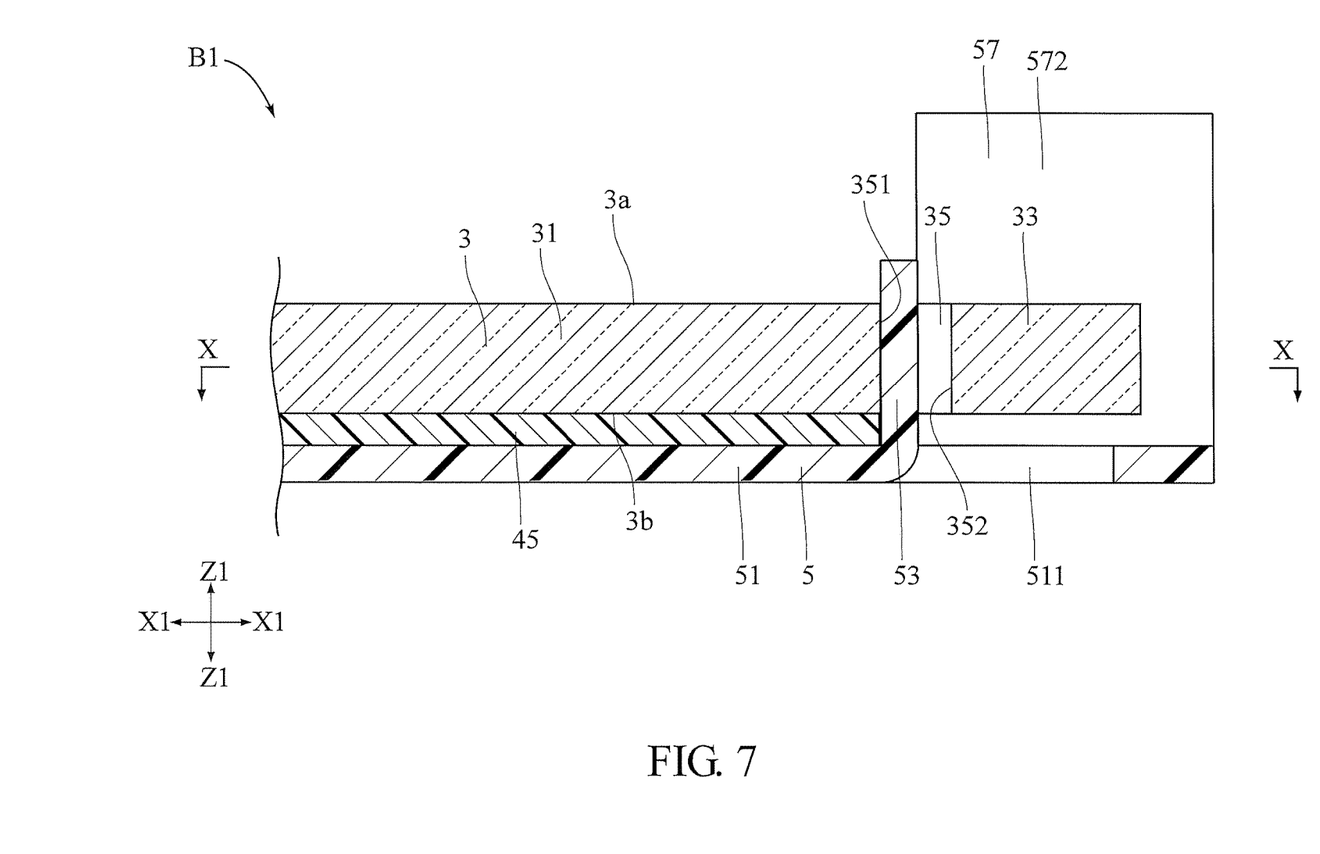
FIG. 7 is a cross-sectional view taken along a line VII-VII in FIG. 6.
Figure 8:
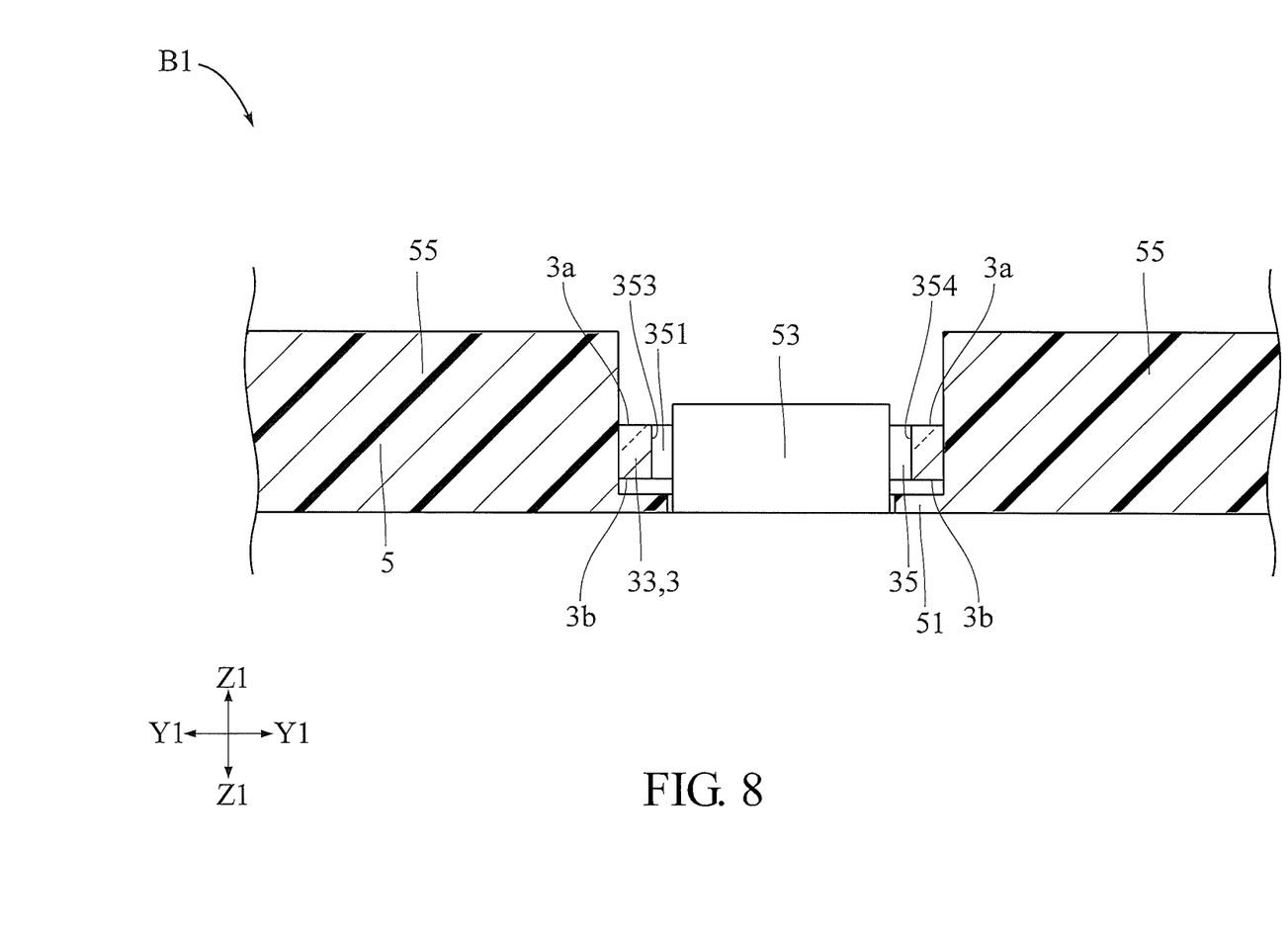
FIG. 8 is a cross-sectional view taken along a line VIII-VIII in FIG. 6.
Figure 9:
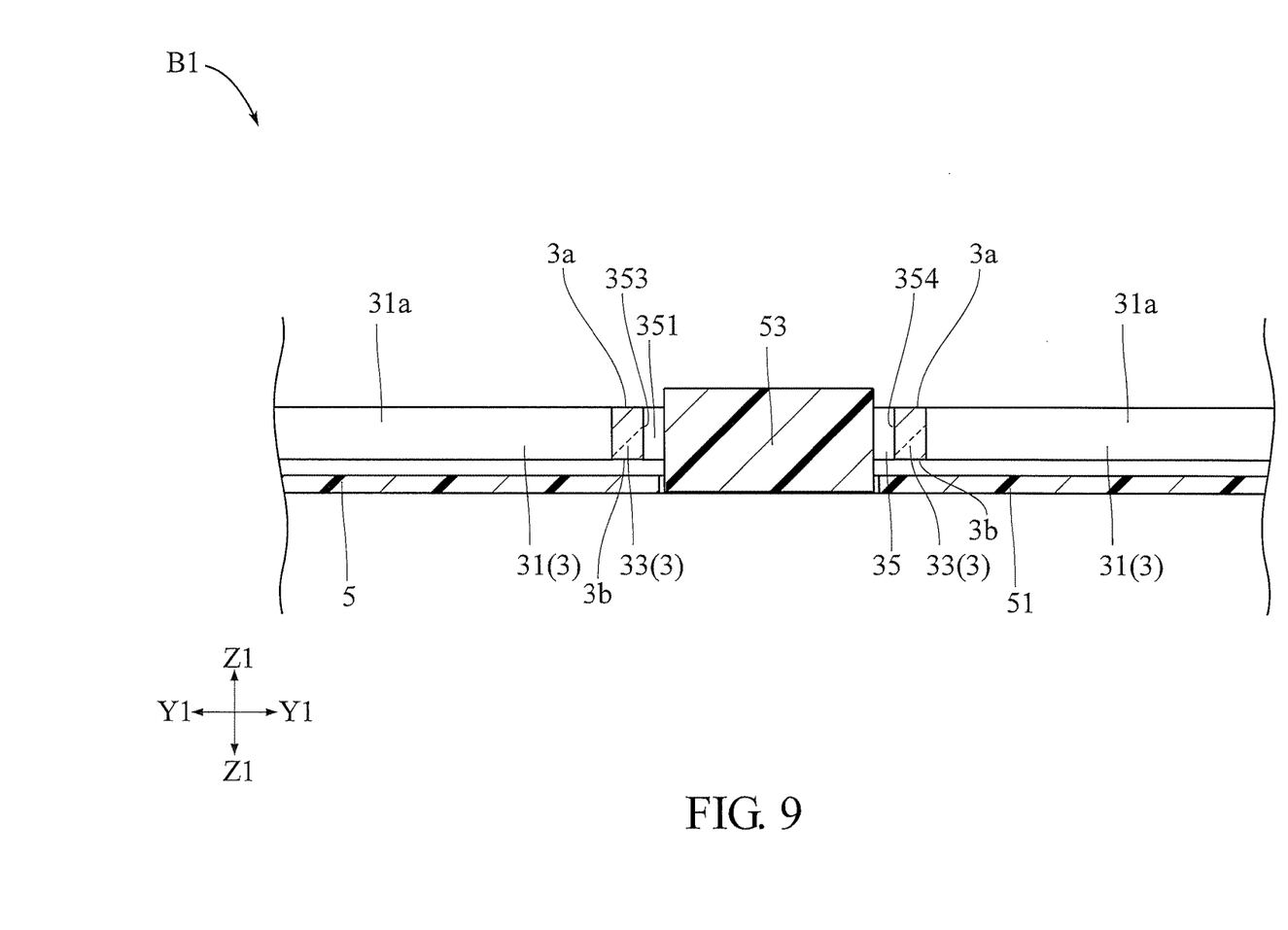
FIG. 9 is a cross-sectional view taken along a line IX-IX in FIG. 6.
Figure 10:
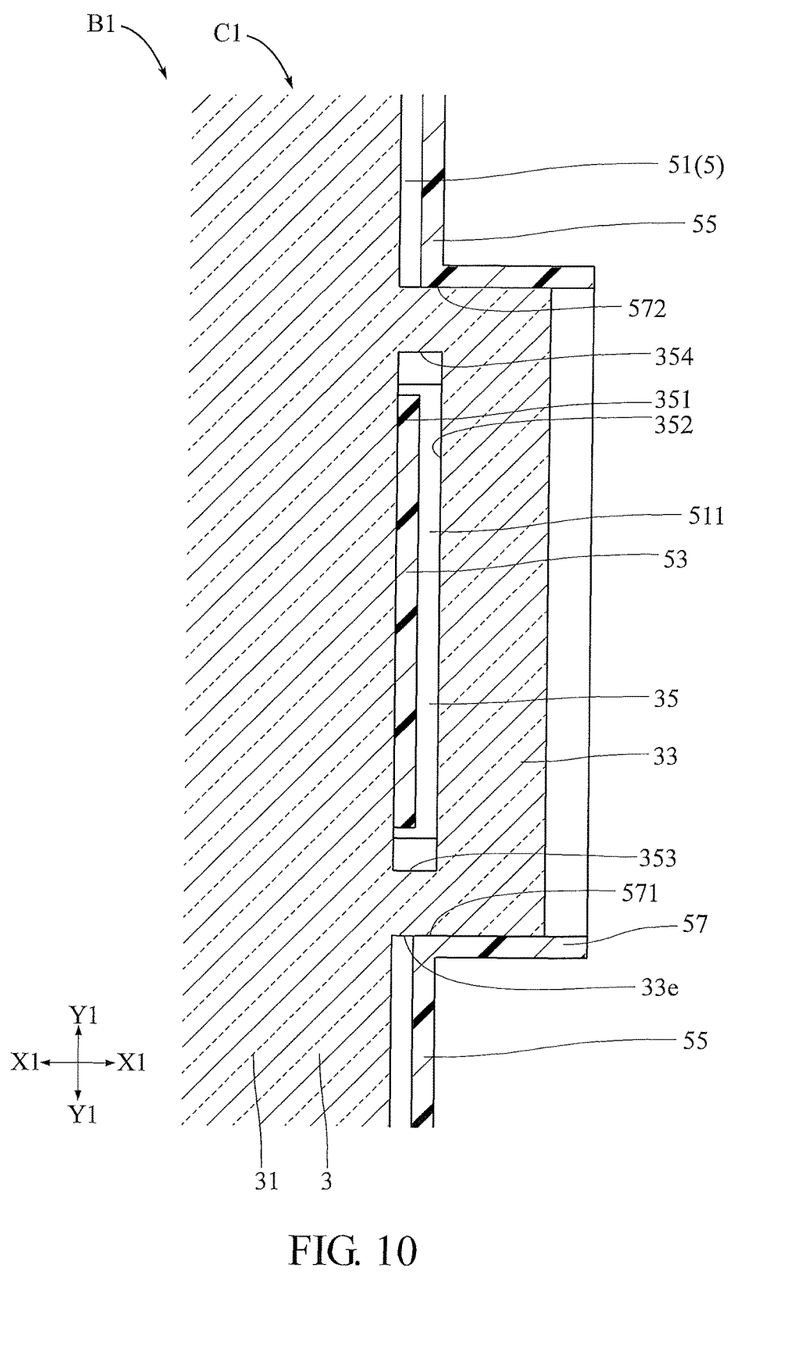
FIG. 10 is a cross-sectional view taken along a line X-X in FIG. 7.

FIG. 7 is a cross-sectional view taken along a line VII-VII in FIG. 6. FIG. 8 is a cross-sectional view taken along a line VIII-VIII in FIG. 6. FIG. 9 is a cross-sectional view taken along a line IX-IX in FIG. 6. FIG. 10 is a cross-sectional view taken along a line X-X in FIG. 7.

As shown in FIGS. 6-10, the gap 35 defines a first wall 351, a second wall 352, a third wall 353, and a fourth wall 354.

Each of the first wall 351, the second wall 352, the third wall 353, and the fourth wall 354 extends from one of the top surface 3a and the bottom surface 3b of the light guide plate 3 toward the other of the top surface 3a and the bottom surface 3b. In FIGS. 7-9, each of the first wall 351, the second wall 352, the third wall 353, and the fourth wall 354 is connected to both the top surface 3a and the bottom surface 3b. Thus, the gap 35 passes through the light guide plate 3 in the thickness direction Z1. In the illustrated example, each of the first wall 351, the second wall 352, the third wall 353, and the fourth wall 354 is flat. However, unlike the illustrated example, one or more of the first wall 351, the second wall 352, the third wall 353, and the fourth wall 354 may be curved.

In one embodiment, a gap may be a recess portion that is recessed from the top surface 3a. In this case, each of a first wall, a second wall, a third wall, and a fourth wall extends from the top surface 3a toward but not reaching the bottom surface 3b. Further, each of the first wall, the second wall, the third wall, and the fourth wall may be connected to the top surface 3a, but may not be connected to the bottom surface 3b. In another embodiment, a gap may be a recess portion that is recessed from the bottom surface 3b. In this case, each of a first wall, a second wall, a third wall, and a fourth wall extends from the bottom surface 3b toward but not reaching the top surface 3a. Further, each of the first wall, the second wall, the third wall, and the fourth wall may be connected to the bottom surface 3b, but may not be connected to the top surface 3a.

As shown in FIGS. 6 and 10, the first wall 351 is proximal to the light guide main body 31. The first wall 351 provides a reflection surface for light waves L2 carried by the light guide plate 3 that approach the protruding portion 33. The light waves L2 proceeding toward the protruding portion 33 inside the light guide plate 3 can be reflected by the first wall 351. The reflected light waves L2 proceed away from the protruding portion 33. In one example, the first wall 351 can be within 1 mm from an extension line LL of the first side edge 31a across the protruding portion 33. In the embodiment illustrated in FIG. 6, the first wall 351 may be located at a position overlapping the extension line LL as viewed in the thickness direction Z1. In one embodiment, the first wall 351 may be located in the protruding portion 33. In another embodiment, the first wall 351 may be located in the light guide main body 31.

Figure 11:
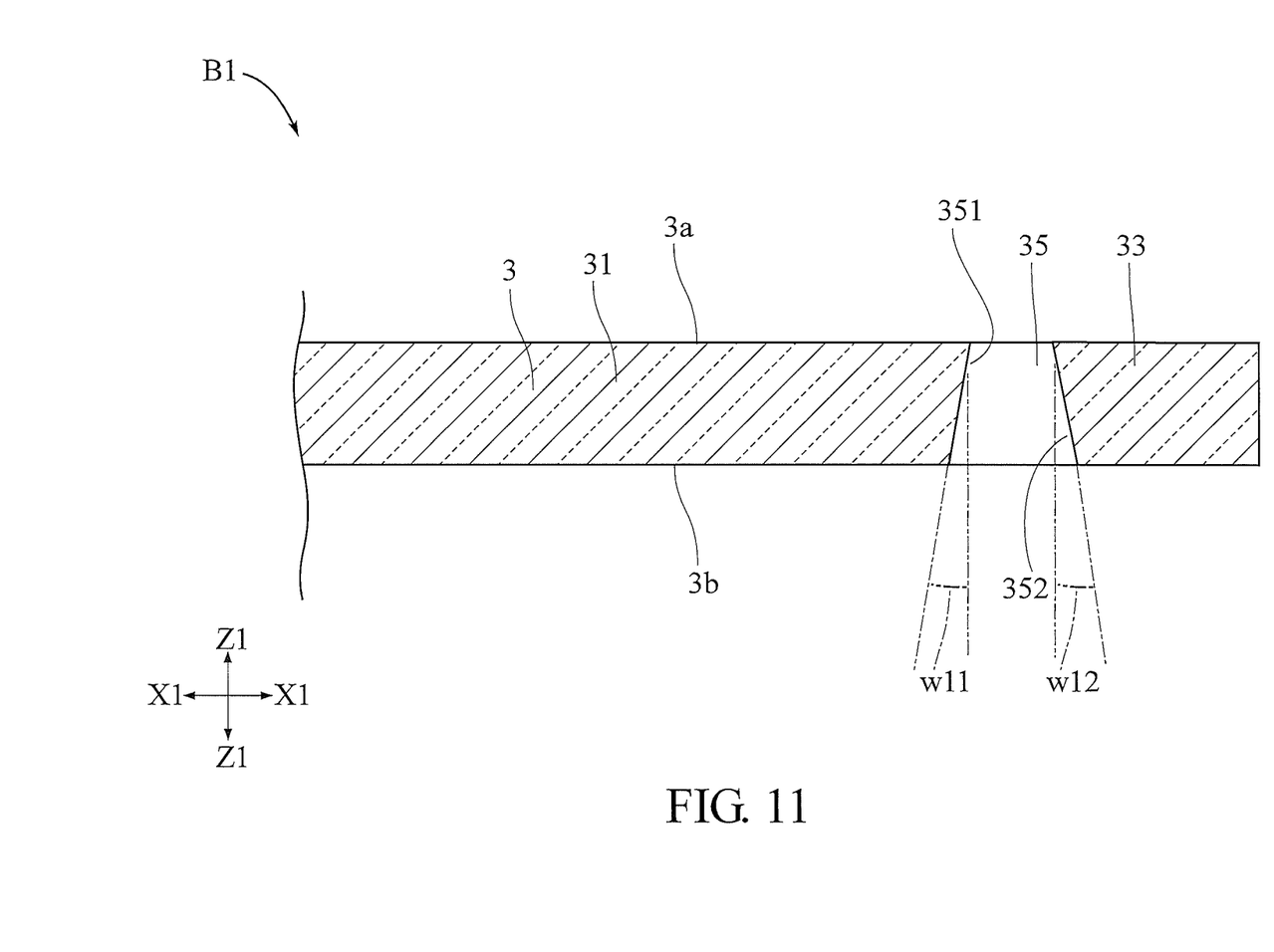
FIG. 11 is a cross-sectional view of a light guide plate according to a variation of one embodiment.
Figure 12:
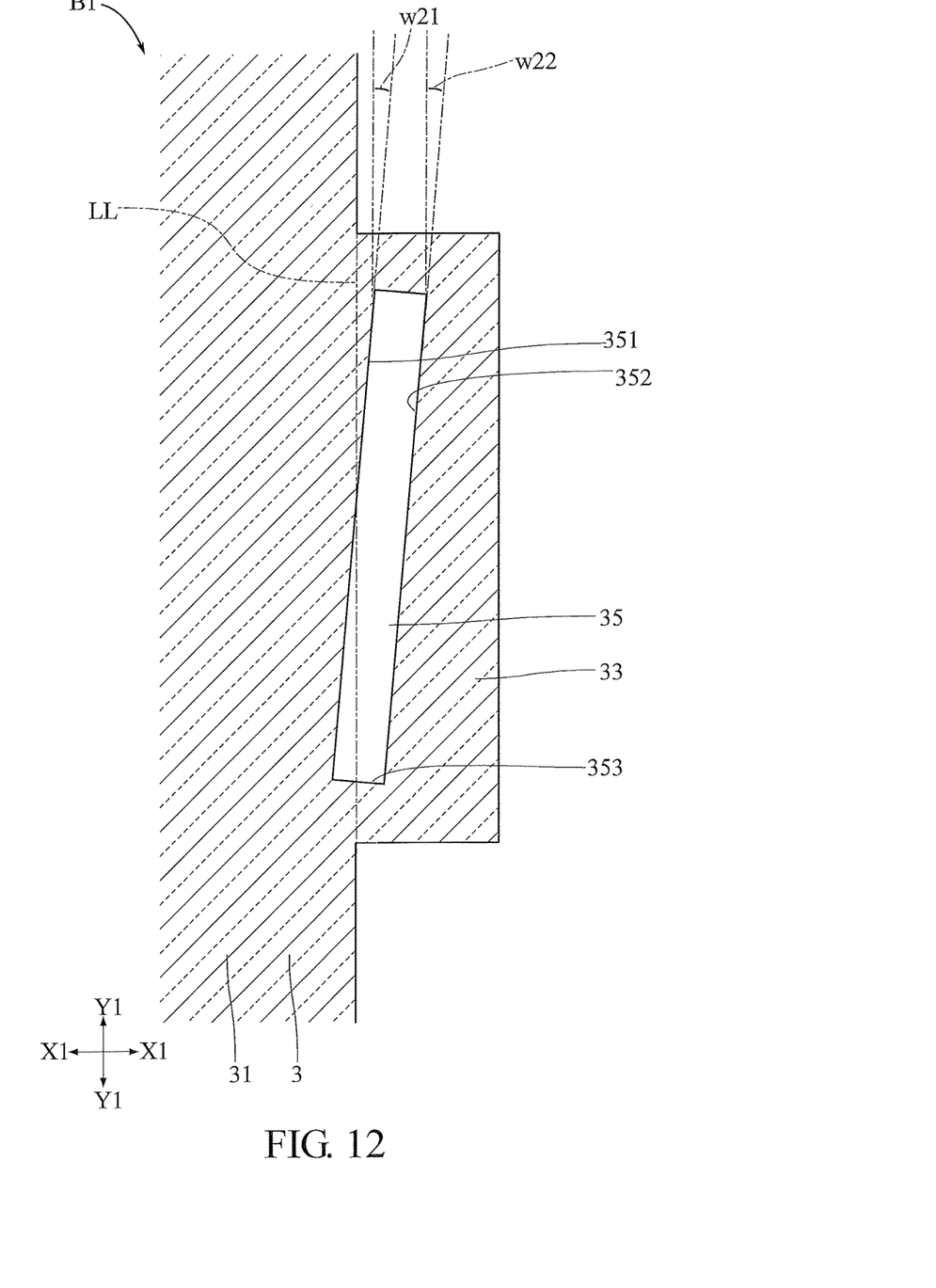
FIG. 12 is a cross-sectional view of a light guide plate according to a variation of one embodiment.

An angle w11 of the first wall 351 to the thickness direction Z1 (see another example in FIG. 11) can be from 0° to 20°. The angle w11 of the first wall 351 to the thickness direction Z1 means an angle of the first wall 351 relative to the thickness direction Z1 in a cross-section along a plane parallel to the first direction X1 and the thickness direction Z1. In the example shown in FIG. 11, the angle w11 is about 10°. In the embodiment shown in FIG. 7, the first wall 351 is in parallel to the thickness direction Z1. Hence, the angle w11 of the first wall 351 to the thickness direction Z1 is 0°. Further, an angle w21 of the first wall 351 to the second direction Y1 (see another example in FIG. 12) can be from 0° to 20°. The angle w21 of the first wall 351 to the second direction Y1 means an angle of the first wall 351 relative to the second direction Y1 in a cross-section along a plane parallel to the first direction X1 and the second direction Y1. In the example shown in FIG. 12, the angle w21 is about 10°. In the embodiment shown in FIG. 10, the first wall 351 is in parallel to the second direction Y1. Hence, the angle w21 of the first wall 351 to the second direction Y1 is 0°.

As shown in FIG. 6, the second wall 352 is distal from the light guide main body 31. The second wall 352 is spaced apart from the first wall 351 in the first direction X1. The second wall 352 is spaced from the first wall 351 by a distance D2. The distance D2 can be, but is not limited to, from 1 mm to 3 mm. In the illustrated embodiment shown in FIG. 6, the second wall 352 and the first wall 351 extend in parallel along the second direction Y1.

An angle w12 of the second wall 352 to the thickness direction Z1 (see FIG. 11) can be from 0° to 20°. The angle w12 of the second wall 352 to the thickness direction Z1 means an angle of the second wall 352 relative to the thickness direction Z1 in a cross-section along a plane parallel to the first direction X1 and the thickness direction Z1. In the example shown in FIG. 11, the angle w12 is about 10°. In the embodiment shown in FIG. 7, the second wall 352 is in parallel to the thickness direction Z1. Hence, the angle w12 of the second wall 352 to the thickness direction Z1 is 0°. Further, an angle w22 of the second wall 352 to the second direction Y1 (see FIG. 12) can be from 0° to 20°. The angle w22 of the second wall 352 to the second direction Y1 means an angle of the second wall 352 relative to the second direction Y1 in a cross-section along a plane parallel to the first direction X1 and the second direction Y1. In the example shown in FIG. 12, the angle w22 is about 10°. In the embodiment shown in FIG. 10, the second wall 352 is in parallel to the second direction Y1. Hence, the angle w22 of the second wall 352 to the second direction Y1 is 0°.

As shown in FIG. 6, the third wall 353 and the fourth wall 354 are spaced apart from each other in the second direction Y1. Each of the third wall 353 and the fourth wall 354 is connected to the first wall 351 and the second wall 352. In the illustrated embodiment shown in FIG. 6, the third wall 353 and the fourth wall 354 extend in parallel in the first direction X1.

In one example of forming the light guide plate 3, the gap 35 can be formed by a mold at the same time that an outer shape that is defined by the light guide main body 31 and the protruding portions 33 is formed by the mold. In another example of forming the light guide plate 3, an outer shape that is defined by the light guide main body 31 and the protruding portions 33 can be formed by trimming with a first blade. Then, each gap 35 can be formed by trimming with a second blade which is smaller than the first blade. The method of forming the light guide plate 3 is not limited to these two examples.

With reference to FIG. 2, each of the optical sheets 41a, 41b, 41c can be made of, for example, synthetic resin, such as polyvinylchloride resin. The optical sheets 41a, 41b, 41c are laminated to each other. The optical sheets 41a, 41b, 41c are disposed between the top surface 3a of the light guide plate 3 and the liquid crystal panel 6. The optical sheet 41a is, for example, a diffusion sheet. The optical sheets 41b, 41c are, for example, prism sheets. In this embodiment, the optical sheet 41a is mounted directly on the top surface 3a of the light guide plate 3. The optical sheet 41b is mounted directly on the optical sheet 41a. The optical sheet 41c is mounted directly on the optical sheet 41b and is held in contact with an adhesive layer 43.

The reflection sheet 45 is disposed on the bottom surface 3b side to the light guide plate 3. Light emitted from the bottom surface 3b is reflected by the reflection sheet 45, enters the light guide plate 3 again, and is eventually emitted from the top surface 3a of the light guide plate 3.

The frame 5 supports the light source 1, the light guide plate 3, the optical sheets 41a, 41b, 41c, and the reflection sheet 45. The frame 5 can be made of an opaque material, and the whole frame 5 can be made of the opaque material. The frame 5 can be made of, but is not limited to, synthetic resin (e.g., polycarbonate resin), or metal (e.g., stainless).

As shown in FIGS. 3, and 5-10 the frame 5 comprises a base portion 51, an upright portion 53, a side portion 55, and a plurality of fitted portions 57 (only one fitted portion 57 is shown in the figures). The base portion 51, the upright portion 53, the side portion 55, and the plurality of fitted portions 57 may be integrally formed.

With reference to FIGS. 3 and 7, the base portion 51 supports the bottom surface 3b of the light guide plate 3. In the illustrated example, the base portion 51 supports the bottom surface 3b via the reflection sheet 45. The base portion 51 can be held in contact with the reflection sheet 45. The side portion 55 extends from the base portion 51. The side portion 55 faces the light guide main body 31 of the light guide plate 3.

As shown in FIGS. 3 and 7, the fitted portion 57 is provided corresponding to the protruding portion 33 of the light guide plate 3. The fitted portion 57 may have a shape corresponding to a shape of the protruding portion 33. The protruding portion 33 is fitted into the fitted portion 57. The protruding portion 33 fitted into the fitted portion 57 can reduce the chance of the light guide plate 3 from being displaced relative to the frame 5 if the liquid crystal display device A1 is subject to an impact during manufacture shipping or use, as described above. The fitted portion 57 forms a part of the base portion 51.

As shown in FIGS. 3 and 6, the fitted portion 57 has a first side wall 571 and a second side wall 572. The first side wall 571 and the second side wall 572 extend from the base portion 51. The first side wall 571 and the second side wall 572 are spaced apart from each other in the second direction Y1. At least a part of the gap 35 may be disposed between the first side wall 571 and the second side wall 572. In the illustrated embodiment, a part of the gap 35 is disposed between the first side wall 571 and the second side wall 572.

As shown in FIGS. 5 and 7, the upright portion 53 extends upward from the base portion 51 into the gap 35 of the light guide plate 3. The upright portion 53 has a part disposed between the first wall 351 and the second wall 352 of the gap 35. The part disposed between the first wall 351 and the second wall 352 of the gap 35 can be made of a light non-transmissible material. In the illustrated example, the upright portion 53 is held in contact with the first wall 351 of the gap 35. The whole upright portion 53 can be made of a light non-transmissible material.

Figure 13:
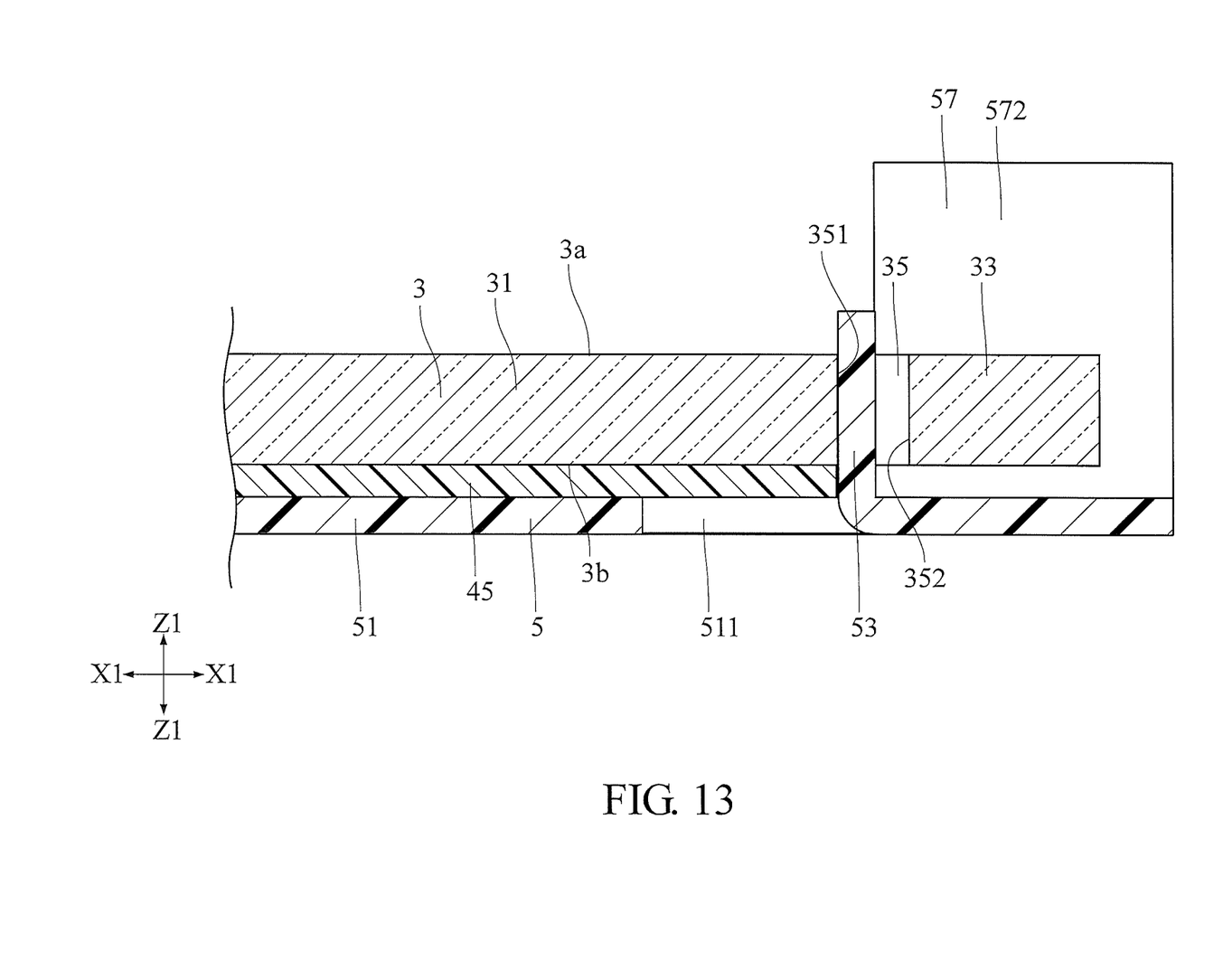
FIG. 13 is a cross-sectional view of a backlight apparatus according to a variation of one embodiment.

As shown in FIGS. 5 and 7, the base portion 51 is provided with a hole 511 adjacent to the upright portion 53. The hole 511 may be formed as a result of folding a part of a base portion of the frame 5. In the embodiment shown in FIG. 7, the hole 511 is located on the opposite side from the light guide main body 31 to the upright portion 53. In another embodiment shown in FIG. 13, the hole 511 may be located in the light guide main body 31 side to the upright portion 53. Unlike the embodiments shown in FIGS. 7 and 13, the frame 5 may not have an upright portion or a hole.

With reference to FIGS. 1 and 2, the liquid crystal panel 6 may be a rectangular as viewed in the thickness direction Z1. The liquid crystal panel 6 is mounted on a light emitting side of the backlight apparatus B1. As shown in a partial enlarged view in FIG. 1, at least a part of the gap 35 of the light guide plate 3 may be disposed outside the liquid crystal panel 6 as viewed in the thickness direction Z1. The diagonal dimension D5 of the liquid crystal panel 6 may be, for example, from 250 to 1500 mm. The liquid crystal panel 6 has a display area 81, and a non-display area 82. The display area 81 may have, for example, a rectangular shape corresponding to the liquid crystal layer 63 (see below). The non-display area 82 may have, for example, a rectangular shape surrounding the display area 81.

As shown in FIG. 2, the liquid crystal panel 6 comprises an array substrate 61, an opposite substrate 62, a liquid crystal layer 63, and polarizing plates 64, 65.

The liquid crystal layer 63 is disposed and sealed between the array substrate 61 and the opposite substrate 62. The liquid crystal layer 63 has liquid crystal molecules between the array substrate 61 and the opposite substrate 62.

The array substrate 61 may have an orientation film (not shown), and switching devices (not shown), such as thin film transistors (TFTs). The orientation film covers the switching devices. The switching devices of the array substrate 61 may switch the amount of transmission (blocking) of light from the backlight C1 through each of multiple pixels formed in a matrix.

The opposite substrate 62 and the array substrate 61 may be bonded with a sealing (not shown). The opposite substrate 62 may have a color filter layer (not shown), a transparent common electrode (not shown), and an orientation film (not shown). In the color filter layer, coloring portions of R (red), G (green), and B (blue), etc., may be formed in a striped manner corresponding to each pixel. The transparent common electrode covers the color filter layer. The transparent common electrode may be formed in the array substrate 61. The orientation film covers the transparent common electrode. The orientation films of the opposite substrate 62 and the array substrate 61 can set an original orientation of the liquid crystal molecules.

The polarizing plate 64 is disposed between the array substrate 61 and the backlight C1. The polarizing plate 64 is bonded to the optical sheet 41c of the backlight C1 via the adhesive layer 43. The polarizing plate 65 is mounted on the opposite substrate 62.

As described above, the light waves L2 (see FIG. 6) proceeding toward the protruding portion 33 inside the light guide plate 3 can be reflected by the first wall 351. The reflected light waves L2 proceeds away from the protruding portion 33. Therefore, the described backlight C1 prevents the region R1 (see FIG. 1) around the protruding portion 33 from being darker. As a result, the luminance along the first side edge 31a can be more uniform so that the image quality on the liquid crystal display device A1 can be improved.

The upright portion 53 extends into the gap 35 of the light guide plate 3 so that the light waves L2 efficiently proceed away from the protruding portion 33. Therefore, the luminance along the first side edge 31a can be more uniform so that the image quality on the liquid crystal display device A1 can be improved.

Figure 14:
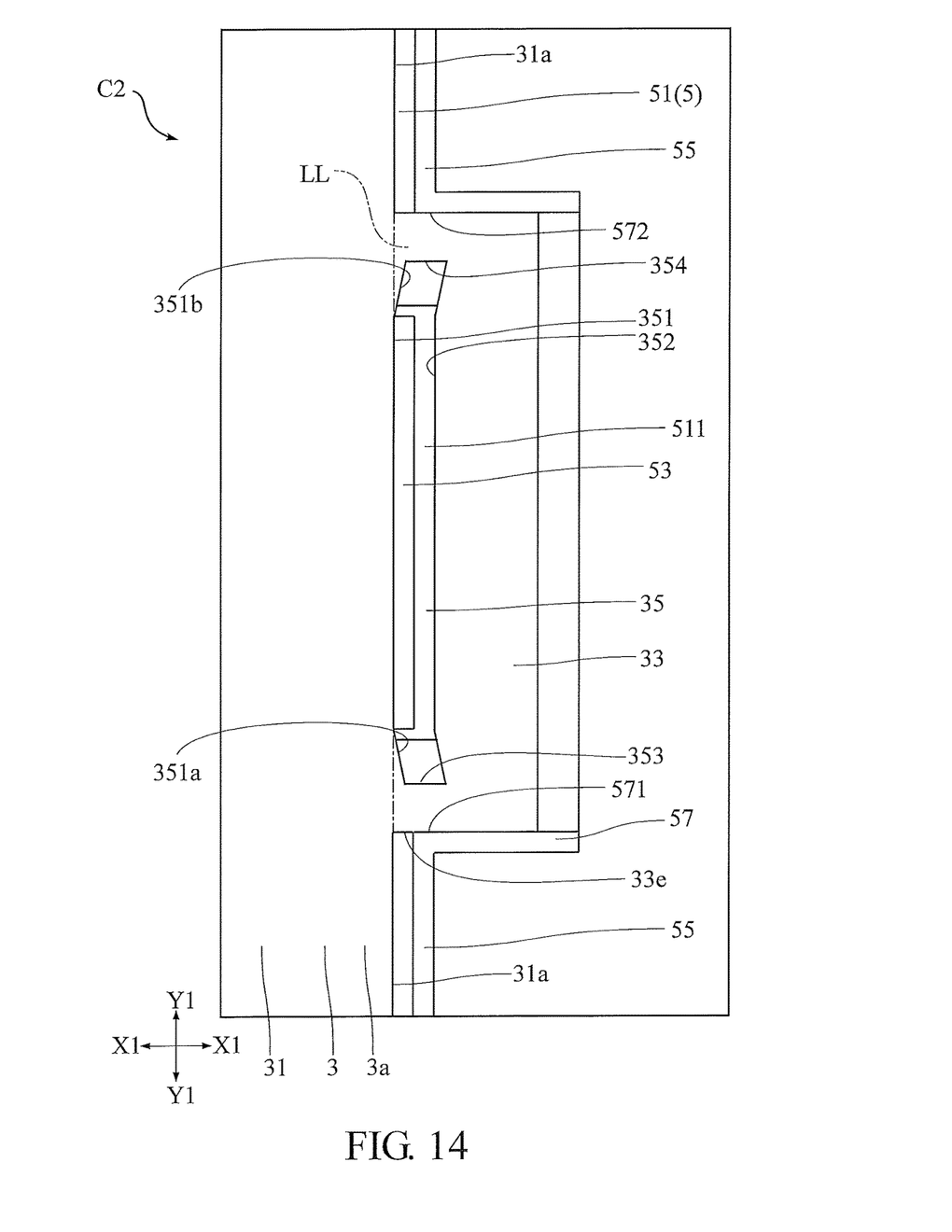
FIG. 14 is a partial top view of the backlight apparatus according to another variation.

FIG. 14 is a partial top view of the backlight apparatus according to another variation. In the description given below, the elements that are identical or similar to those of the foregoing embodiment are designated by the same reference signs as those used for the foregoing embodiment, and the description is not repeated here.

The backlight C2 shown in the figure is different from the above-described backlight C1 in the shape of the gap 35. The first wall 351 of the gap 35 has a first end portion 351a and a second end portion 351b. Each first end portion 351a and second end portion 351b extends outward away from the light guide main body 31. Each first end portion 351a and second end portion 351b can achieve more uniform luminance along the first side edge 31a so that the image quality on the liquid crystal display device can be improved.

The concepts described may be embodied in other forms without departing from the spirit or novel characteristics thereof. The examples disclosed in this application are to be considered in all respects as illustrative and not limitative.

The invention claimed is:

1. A backlight apparatus, comprising:
   a backlight comprising a light guide plate; and
   a frame supporting the backlight and comprising a fitted portion,
   wherein the light guide plate comprises a light guide main body with linear side edges, and a protruding portion extending outward from one of the side edges of the light guide main body in a first direction orthogonal to a thickness direction of the light guide plate, the protruding portion being fitted into the fitted portion,
   the light guide plate is provided with a gap formed at least partially in the protruding portion,
   the gap defines a first wall extending from one of a top surface and a bottom surface of the light guide plate toward the other of the top surface and the bottom surface, the first wall provides a reflection surface for light waves carried by the light guide plate that approach the protruding portion, and the gap extends longitudinally by a length of 40 to 80% of a width of the protruding portion as viewed in the thickness direction.

2. The backlight apparatus of claim 1, wherein the gap defines a second wall extending from the one of the top surface and the bottom surface, the second wall being spaced apart from the first wall in the first direction, and the first wall and the second wall extend in parallel.

3. The backlight apparatus of claim 2, wherein each end of the gap is spaced from an edge of the protruding portion by a distance of 5 to 10 mm.

4. The backlight apparatus of claim 2, wherein an angle of the first wall to the thickness direction is from 0° to 20°, and an angle of the second wall to the thickness direction is from 0° to 20°.

5. The backlight apparatus of claim 2, wherein an angle of the first wall to a second direction orthogonal to the thickness direction and the first direction is from 0° to 20°, and an angle of the second wall to the second direction is from 0° to 20°.

6. The backlight apparatus of claim 1, wherein the gap passes through the light guide plate in the thickness direction.

7. The backlight apparatus of claim 2, wherein the first wall is spaced from the second wall by a distance of 1 to 3 mm.

8. A backlight apparatus, comprising:
a backlight comprising a light guide plate; and
a frame supporting the backlight and comprising a fitted portion,
wherein the light guide plate comprises a light guide main body with linear side edges, and a protruding portion extending outward from one of the side edges of the light guide main body in a first direction orthogonal to a thickness direction of the light guide plate, the protruding portion being fitted into the fitted portion,
the light guide plate is provided with a gap formed at least partially in the protruding portion,
the gap defines a first wall extending from one of a top surface and a bottom surface of the light guide plate toward the other of the top surface and the bottom surface,
the first wall provides a reflection surface for light waves carried by the light guide plate that approach the protruding portion, and
the first wall is within 1 mm from an extension line of the one of the side edges across the protruding portion.

9. A backlight apparatus, comprising:
a backlight comprising a light guide plate; and
a frame supporting the backlight and comprising a fitted portion,
wherein the light guide plate comprises a light guide main body with linear side edges, and a protruding portion extending outward from one of the side edges of the light guide main body in a first direction orthogonal to a thickness direction of the light guide plate, the protruding portion being fitted into the fitted portion,
the light guide plate is provided with a gap formed at least partially in the protruding portion,
the gap defines a first wall extending from one of a top surface and a bottom surface of the light guide plate toward the other of the top surface and the bottom surface, the first wall provides a reflection surface for light waves carried by the light guide plate that approach the protruding portion, and the first wall has an end portion extending outward away from the light guide main body.

10. The backlight apparatus of claim 1, wherein the frame includes a base portion supporting the bottom surface of the light guide plate, and an upright portion extending upward from the base portion into the gap of the light guide plate.

11. The backlight apparatus of claim 10, wherein the base portion is provided with a hole adjacent to the upright portion.

12. The backlight apparatus of claim 1, wherein the fitted portion has a shape corresponding to a shape of the protruding portion, and the fitted portion of the frame comprises two side walls, at least a part of the gap being disposed between the two side walls.

13. A liquid crystal display device, comprising:
the backlight apparatus of claim 1; and
a liquid crystal panel mounted on a light emitting side of the backlight apparatus,
wherein at least a part of the gap of the light guide plate is disposed outside the liquid crystal panel as viewed in the thickness direction.

14. The liquid crystal display device of claim 13, wherein a diagonal dimension of the liquid crystal panel is from 250 to 1500 mm.

15. The backlight apparatus of claim 8, wherein the gap defines a second wall extending from the one of the top surface and the bottom surface, the second wall being spaced apart from the first wall in the first direction, and the first wall and the second wall extend in parallel.

16. The backlight apparatus of claim 15, wherein the first wall is spaced from the second wall by a distance of 1 to 3 mm.

17. The backlight apparatus of claim 9, wherein the gap defines a second wall extending from the one of the top surface and the bottom surface, the second wall being spaced apart from the first wall in the first direction, and the first wall and the second wall extend in parallel.

18. The backlight apparatus of claim 17, wherein the first wall is spaced from the second wall by a distance of 1 to 3 mm.

19. A liquid crystal display device, comprising:
the backlight apparatus of claim 8; and
a liquid crystal panel mounted on a light emitting side of the backlight apparatus,
wherein at least a part of the gap of the light guide plate is disposed outside the liquid crystal panel as viewed in the thickness direction.

20. The liquid crystal display device of claim 19, wherein a diagonal dimension of the liquid crystal panel is from 250 to 1500 mm.

21. A liquid crystal display device, comprising:
the backlight apparatus of claim 9; and
a liquid crystal panel mounted on a light emitting side of the backlight apparatus,
wherein at least a part of the gap of the light guide plate is disposed outside the liquid crystal panel as viewed in the thickness direction.

22. The liquid crystal display device of claim 21, wherein a diagonal dimension of the liquid crystal panel is from 250 to 1500 mm.

* * * * *